(12) United States Patent
Fox, Jr.

(10) Patent No.: US 12,110,119 B2
(45) Date of Patent: Oct. 8, 2024

(54) AIRDROP AZIMUTH CONTROL SYSTEM

(71) Applicant: Roy L. Fox, Jr., Yuma, AZ (US)

(72) Inventor: Roy L. Fox, Jr., Yuma, AZ (US)

(*) Notice: Subject to any disclaimer, the term of this patent is extended or adjusted under 35 U.S.C. 154(b) by 31 days.

(21) Appl. No.: 18/059,009

(22) Filed: Nov. 28, 2022

(65) Prior Publication Data

US 2023/0174242 A1 Jun. 8, 2023

Related U.S. Application Data

(63) Continuation of application No. 17/551,530, filed on Dec. 15, 2021, now Pat. No. 11,511,869.

(60) Provisional application No. 63/125,547, filed on Dec. 15, 2020.

(51) Int. Cl.
*B64D 17/78* (2006.01)
*B64D 17/22* (2006.01)

(52) U.S. Cl.
CPC ............. *B64D 17/78* (2013.01); *B64D 17/22* (2013.01)

(58) Field of Classification Search
CPC .............................. B64D 17/22; B64D 17/78
See application file for complete search history.

(56) References Cited

U.S. PATENT DOCUMENTS

| | | | | |
|---|---|---|---|---|
| 3,118,641 | A * | 1/1964 | Barish | B64D 17/383 403/164 |
| 8,939,056 | B1 * | 1/2015 | Neal, III | F42B 15/22 89/1.51 |
| 2003/0025038 | A1 * | 2/2003 | Nicolai | B64C 39/024 244/152 |
| 2009/0294594 | A1 * | 12/2009 | Deazley | B64D 17/386 244/149 |
| 2011/0315806 | A1 * | 12/2011 | Piasecki | B64C 39/02 244/17.11 |
| 2013/0048787 | A1 * | 2/2013 | Riley | B64D 17/34 244/137.1 |
| 2016/0137303 | A1 * | 5/2016 | Pullam | G05D 1/105 701/4 |

* cited by examiner

*Primary Examiner* — Tye William Abell
(74) *Attorney, Agent, or Firm* — Snell & Wilmer L.L.P.

(57) ABSTRACT

A parachute system includes a payload support configured to operably support a payload below a parachute and an azimuth control device mounted to the payload support and/or the payload. The azimuth control device is configured to operably impart a yaw rotation to the payload in order to adjust an azimuth of the payload. The azimuth control device may include a thrust producing fluid jet device, a thrust producing propeller device, and/or a manipulatable control surface, among others.

17 Claims, 9 Drawing Sheets

AIRDROP AZIMUTH CONTROL SYSTEM

CROSS REFERENCE TO RELATED APPLICATIONS

This application is a continuation of U.S. Ser. No. 17/551,530 filed on Dec. 15, 2021, now U.S. Pat. No. 11,511,869 entitled "AIRDROP AZIMUTH CONTROL SYSTEM." U.S. Ser. No. 17/551,530 claims priority to, and the benefit of, U.S. Provisional Patent Application Ser. No. 63/125,547 filed on Dec. 15, 2020 and entitled "AIRDROP AZIMUTH CONTROL SYSTEM." Each of the foregoing applications are hereby incorporated by reference in their entirety for all purposes, including but not limited to those portions that specifically appear hereinafter, but except for any subject matter disclaimers or disavowals, and except to the extent that the incorporated material is inconsistent with the express disclosure herein, in which case the language in this disclosure shall control.

FIELD

The present disclosure relates to parachute systems, particularly to systems and methods for controlling azimuth of a payload suspended from a deployed parachute.

BACKGROUND

Aerial delivery is frequently used for transporting or deploying a payload from an aircraft. In certain situations, deployment of a munitions payload from in-flight aircraft may provide various benefits. Such aerial delivery systems may involve the use of parachute systems to progressively slow the descent velocity of the payload. Use of a series of parachute deployments is often necessary because the force and impulse on the suspension lines and straps of a main parachute (i.e., a parachute large enough to slow the cargo platform to an acceptable landing velocity) deploying at the terminal, free-fall velocity of the cargo platform or vehicle would be excessive, causing the parachute system to fail.

In some instances, it may be desirable to have the payload facing a desired direction during descent. For example, the payload may be configured to deploy/release an item (e.g., a missile). If the payload does not have the proper azimuth orientation, the dispensed item may need to gain momentum before being able to change course to move toward its target. If the item has a propulsion means, fuel will be consumed in the process of changing course and the range of the item will, thereby, be reduced, relative to the target. If the dispensed item is gravity propelled and has a gliding capability, altitude will be lost in the course correction process and, again, the effective range of the item, relative to the target, will be reduced. Certain parachutes may be steerable, and thus azimuth corrections for the payload may be accomplished by controlling/steering the parachute. However, azimuth changes when the payload is suspended beneath a ballistic parachute are not nearly as straightforward.

While certain conventional solutions may utilize a threaded connection between the payload and the parachute, such configurations are somewhat limited by the amount of rotational travel provided by the threaded interface, thereby potentially limiting the extent/duration of azimuth control that can be achieved. For example, if the interfacing mechanism between the payload and the parachute may have a nut and screw structure, such that the azimuth correction can only be made in one direction and the direction is dependent on whether the threads of the nut and screw are clockwise or counter clockwise. For instance, with clockwise threads, if an azimuth change of 10 degrees to the right is desired, it is quite straightforward, but, if a 10 degree change to the left is desired, a right turn of 350 degrees would be required. Moreover, in some instances, there may be some system asymmetry involved that will cause the system to continuously rotate in one direction. In such a scenario, it may be necessary to continuously make azimuth corrections in the opposite direction to maintain a desired heading. Such a continuous azimuth correction might well prematurely consume all the azimuth correction capability of the mechanism.

In an attempt to combat the limitations of the gravity powered mechanism, a motor could be added to cause either the nut or the screw to rotate. But, because the mechanism is positioned by flexible elements between two masses, one mass being the payload and the other mass being the air trapped inside the parachute canopy, and these flexible elements would mostly likely twist instead of imparting an azimuth change to the payload. Accordingly, improved systems and methods for azimuth control of a payload remain desirable.

SUMMARY

A parachute system is disclosed, comprising a payload support configured to operably support a payload below a parachute, and an azimuth control device mounted to at least one of the payload support or the payload.

In various embodiments, the payload support comprises a platform and the azimuth control device is mounted to the platform. In various embodiments, the azimuth control device is configured to operably impart a yaw rotation to the payload in order to adjust an azimuth of the payload. In various embodiments, the azimuth control device is mounted to the payload support a distance offset from a vertical center of mass axis of the payload in order to create torque to thereby induce the yaw rotation. In various embodiments, the azimuth control device comprises a fluid jet device configured to emit a thrust producing fluid stream. In various embodiments, the azimuth control device comprises a thrust producing propeller device. In various embodiments, the azimuth control device comprises a manipulatable control surface. In various embodiments, the azimuth control device is configured to be in a stowed position before and during an initial deployment phase of the payload and is configured to transition to an operable position after the initial deployment phase.

In various embodiments, the parachute system further comprises a controller coupled in control providing communication with the azimuth control device, the controller comprising a processor and a tangible, non-transitory computer-readable storage medium having instructions stored thereon that, in response to execution by the processor, cause the processor to control the azimuth control device. In various embodiments, the azimuth control device comprises one or more rudders disposed on a periphery of the platform. In various embodiments, the azimuth control device is configured to exert a force in a first direction at a first time and further configured to exert a force in a second direction at a second time, the second direction is opposite from the first direction. In various embodiments, the parachute system further comprises an interface configured to be coupled between the payload and the parachute. In various embodiments, the interface comprises a first clevis/shackle and a second clevis/shackle configured to rotate with respect to the first clevis/shackle.

A method of using a parachute system is disclosed, the method comprising coupling an azimuth control device to at least one of a payload support or a payload, deploying the payload from an aircraft, deploying a parachute coupled to the payload support, and operating the azimuth control device to adjust an azimuth of the payload during descent of the payload beneath the parachute.

A parachute system is disclosed, comprising a parachute, a payload support configured to operably support a payload below the parachute, an interface between the parachute and the payload, and an azimuth control device mounted to at least one of the payload support or the payload.

In various embodiments, the azimuth control device is configured to operably impart a yaw rotation to the payload in order to adjust an azimuth of the payload. In various embodiments, the interface is configured to rotate in response to the azimuth of the payload being adjusted. In various embodiments, the interface is configured to accommodate the yaw rotation of the payload. In various embodiments, the interface comprises a textile sling. In various embodiments, the interface comprises a pair of clevises/shackles.

The foregoing features and elements may be combined in various combinations without exclusivity, unless expressly indicated herein otherwise. These features and elements as well as the operation of the disclosed embodiments will become more apparent in light of the following description and accompanying drawings. The contents of this section are intended as a simplified introduction to the disclosure, and are not intended to limit the scope of any claim.

BRIEF DESCRIPTION OF THE DRAWINGS

In order that the advantages of the disclosure will be readily understood, a more particular description of the disclosure is rendered by reference to the appended drawings. Thus, although the subject matter of the present disclosure is particularly pointed out and distinctly claimed in the concluding portion of the specification, a more complete understanding of the present disclosure, may best be obtained by referring to the detailed description and claims when considered in connection with the drawing figures. Understanding that these drawings depict only typical embodiments of the disclosure and are not therefore to be considered to be limiting of its scope, the subject matter of the present application will be described and explained with additional specificity and detail through the use of the accompanying drawings, in which:

DETAILED DESCRIPTION

Figure 1A:
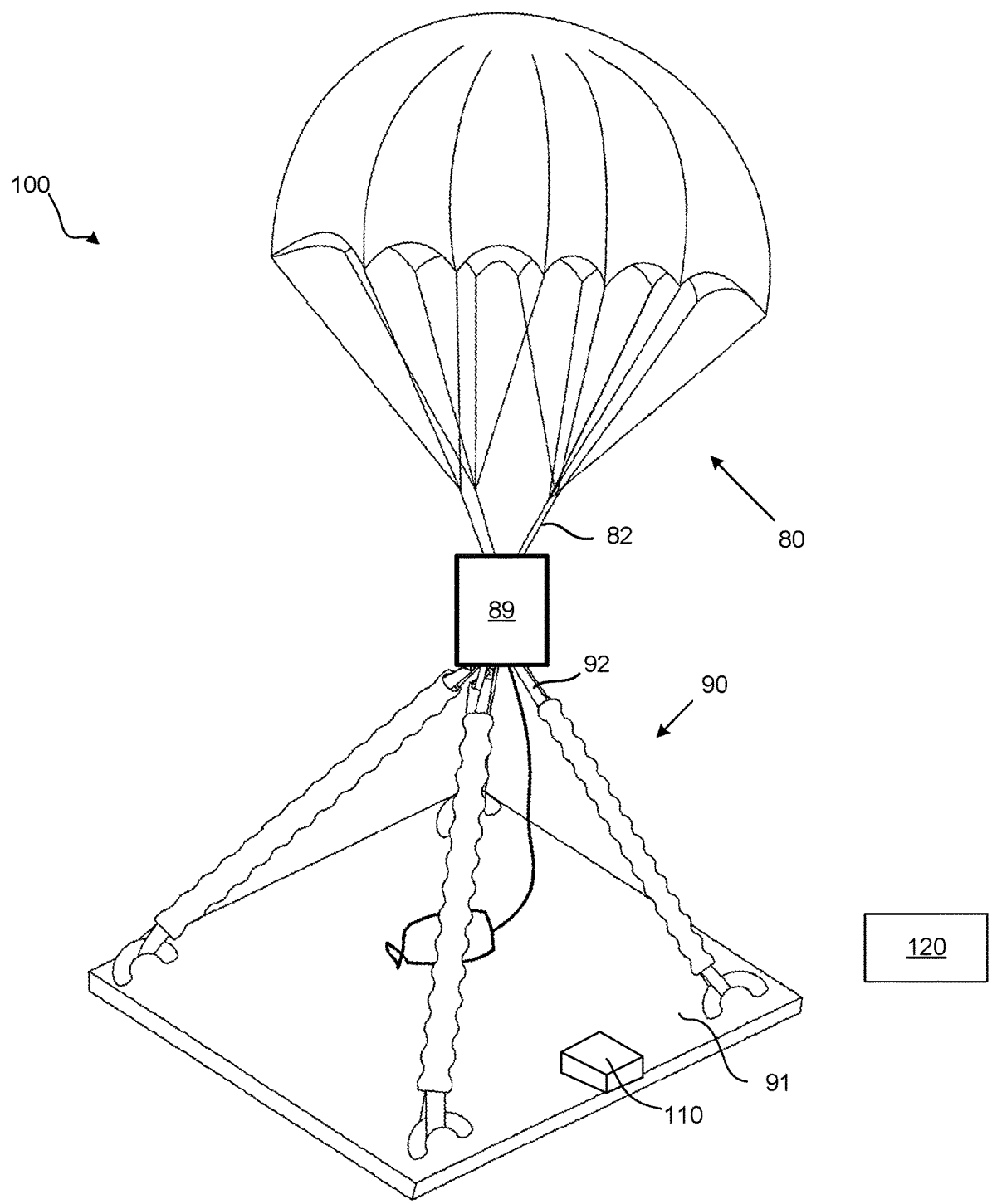
FIG. 1A is a schematic perspective view of a parachute system comprising a parachute, a payload support, and an azimuth control device, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, the terms "including," "comprising," "having," and variations thereof mean "including but not limited to" unless expressly specified otherwise. Accordingly, the terms "including," "comprising," "having," and variations thereof are intended to cover a non-exclusive inclusion, such that a process, method, article, or apparatus that comprises a list of elements does not include only those elements but may include other elements not expressly listed or inherent to such process, method, article, or apparatus. An enumerated listing of items does not imply that any or all of the items are mutually exclusive and/or mutually inclusive, unless expressly specified otherwise.

Further, in the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Thus, when a particular feature, structure, or characteristic is described in connection with an embodiment, it is submitted that it is within the knowledge of one skilled in the art to affect such feature, structure, or characteristic in connection with other embodiments whether or not explicitly described. Similarly, the use of the term "implementation" means an implementation having a particular feature, structure, or characteristic described in connection with one or more embodiments of the present disclosure. Absent an express correlation to indicate otherwise, an implementation may be associated with one or more embodiments. After reading the description, it will be apparent to one skilled in the relevant art(s) how to implement the disclosure in alternative embodiments.

For the sake of brevity, conventional techniques for parachute construction, deployment, reefing, disreefing, release, recovery, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical azimuth control system.

A parachute system may be any system configured to facilitate deployment of a payload from an aircraft using a parachute to slow the descent of the payload. As mentioned above, a ballistic parachute will drift with the air mass through which it is descending. In certain implementations, the azimuth of the payload may desirably be controlled during descent. Accordingly, the present disclosure provides various principles and embodiments of azimuth control devices of a parachute system to facilitate a payload pointed in a desired direction (e.g., toward a target).

In accordance with various embodiments, and with reference to FIG. 1A, a parachute system 100 generally includes a connecting interface 89 interconnected between a parachute 80 and a payload support 90 configured to support a payload (not depicted in FIG. 1A). Parachute 80 may include risers 82 and payload support 90 may include a platform 91 and/or suspension straps 92, as described in greater detail below. The parachute system 100 further includes an azimuth control device 110 (depicted schematically), according to various embodiments. As described in greater detail below, the azimuth control device 110 is coupled/mounted to the payload support 90 and/or the payload 95 (e.g., see FIG. 1B) and is configured to operably impart a yaw rotation to the payload in order to adjust an azimuth of the payload, according to various embodiments.

Figure 1B:
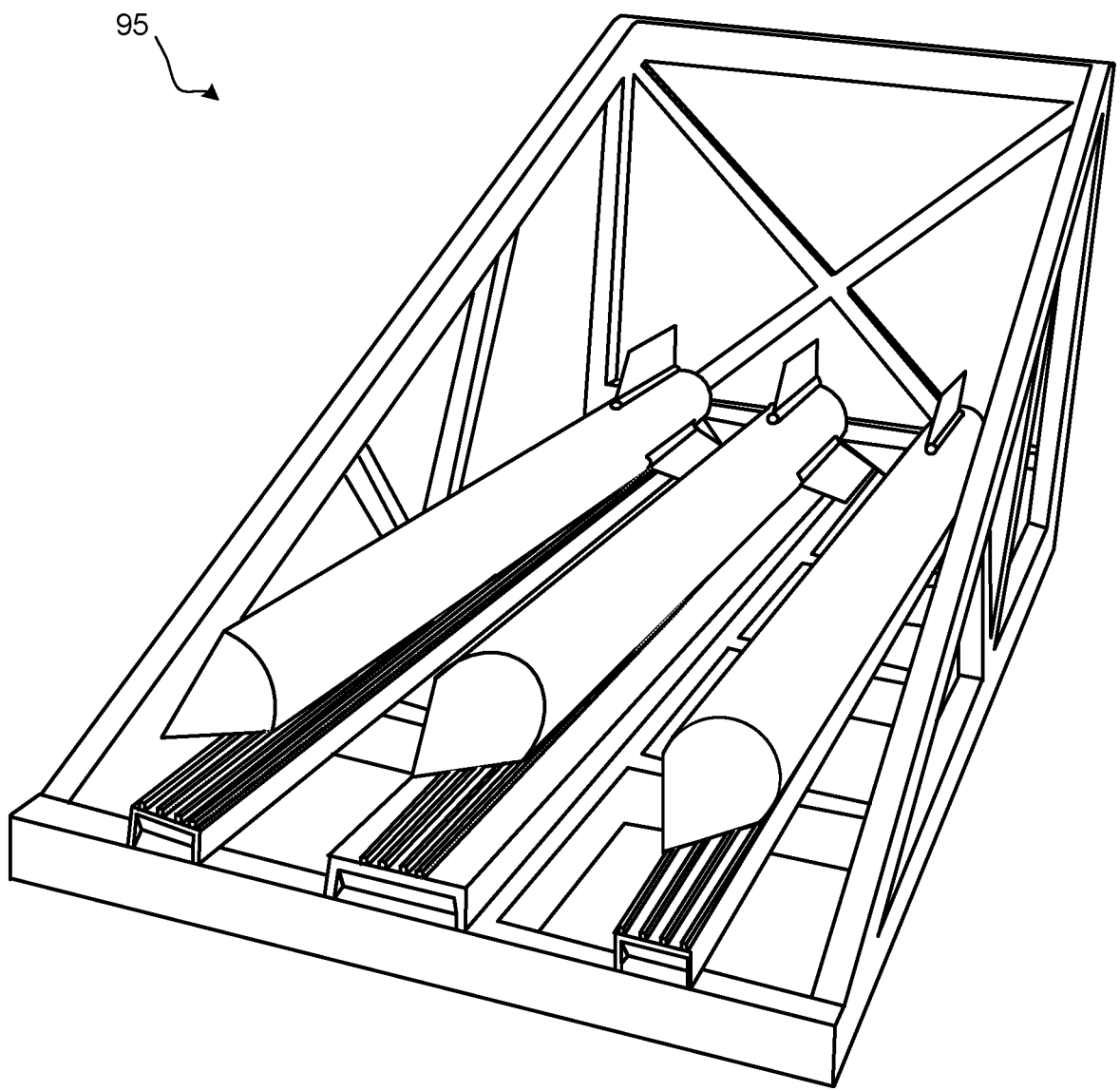
FIG. 1B is a perspective view of an exemplary payload that may benefit from azimuth control, in accordance with various embodiments.

In various embodiments, and with momentary reference to FIG. 1B, one possible example of a payload 95 that may benefit from azimuth control is provided. That is, the payload may be configured with munitions or other cargo that are configured to be controllably released/discharged in a specific direction (e.g., towards a target). In various embodiments, the payload may contain a plurality of releasable items. The directional discharge item(s) may be configured for any specific purpose. For example, a directional discharge item could be a piece of ordnance too large to fit a conventional aircraft bomb bay. In various embodiments, directional discharge items are configured to be controllably and selectively launched as the payload descends with a ballistic trajectory below the parachute. Moreover, the attitude and/or azimuth of the payload may be varied before and/or between discharges in order to more effectively direct directional discharge items toward one or more targets.

As used herein, the term "payload support" refers to the structures and components that suspend the payload below the parachute. As mentioned above, the payload support may include one or more suspension straps and may also include a platform. In various embodiments, payload support refers to one or more suspension straps (such as suspension straps 92 of FIG. 1A) that extend from the parachute risers to support the payload. The suspension straps may be directly coupled to the payload and/or may be indirectly coupled to the payload via a platform (such as platform 91 of FIG. 1A). In the directly coupled configuration, the one or more suspension straps may be directly anchored/affixed to the payload. For example, the payload (such as payload 95 of FIG. 1B) may include one or more structural members, and the one or more suspension straps may be anchored to these structural members of the payload. These structural members of the payload may function as an interface between the suspension straps and the payload. In the indirectly coupled configuration, the payload support includes the platform and the platform may be suspended by the one or more suspension straps. Whether in the directly coupled configuration or the indirectly coupled configuration, a platform may serve as an interface between the payload and the cargo floor of an aircraft. In various embodiments, the payload is secured to the platform.

In various embodiments, and with renewed reference to FIG. 1A, azimuth control device 110 is mounted to platform 91. However, in other configurations and embodiments the azimuth control device 110 may be mounted to the suspension straps, to the payload itself, and/or to the connecting interface between the parachute and the payload support. In various embodiments, azimuth control device 110 is mounted to the payload support a distance offset from a vertical center of mass axis of the payload. By positioning azimuth control device 110 in this offset manner, azimuth control device 110 operably creates a torque about the vertical axis to induce the yaw rotation and thereby control the azimuth of the payload during descent beneath one or more parachutes. For example, the one or more azimuth control devices may be mounted at or near the periphery of the payload. In various embodiments, in order to maximize the moment arm, the azimuth control device may be mounted on or near one of the ends of the payload support that is farthest from the vertical axis (e.g., mounted to a front or rear of the payload assembly). In various embodiments, if the item being dispensed from the payload is configured to eject with a horizontal trajectory (e.g., a missile), it may be beneficial to position the azimuth control device near the rear of the payload assembly to avoid an interference with the dispensing process.

In various embodiments, parachute system 100 further includes a controller 120 coupled in control providing communication with azimuth control device 110. Controller 120 may generally include a processor and a tangible, non-transitory computer-readable storage medium having instructions stored thereon that, in response to execution by the processor, cause the processor to perform various operations. The various operations performed by the processor of controller 120 may include controlling the activation timing, the magnitude, and the duration of the azimuth control device 110. For example, it is quite common for an aircraft to be kept on course by an autopilot and the course information may come from a compass or a GPS device, and the same or similar computer systems, hardware, processors, and/or software logic may be used in this context for controlling the direction of the payload during descent. Controller 120 may be wired and/or wireless communication with azimuth control device 110. Additionally, controller 120 may be wired and/or wireless communication with external systems, for example aircraft navigation systems or other systems associated with the aircraft which deployed the payload, a tactical data link, a Battlefield Airborne Communications Node (BACN), and/or the like. In this manner, operation of azimuth control device 110 may be managed from various locations and/or systems in order to achieve desired tactical or strategic objectives (for example, deploying a first missile at a first orientation configured to facilitate a strike on a first target, thereafter changing the azimuth of the payload and deploying a second missile at a second orientation configured to facilitate a strike on a second target, and so forth). Controller 120 and/or azimuth control device 110 may be coupled to, comprise, communicate with, and/or contain various components configured to determine, measure, and/or report an azimuth of the payload, for example one or more compasses, gyroscopes, accelerometers, force sensors, and/or the like.

In various embodiments, the controller is implemented in a single processor. In various embodiments, the controller may be implemented as and may include one or more processors and/or one or more tangible, non-transitory memories and be capable of implementing logic. Each processor can be a general-purpose processor, a digital signal processor (DSP), an application specific integrated circuit (ASIC), a field programmable gate array (FPGA) or other programmable logic device, discrete gate or transistor logic, discrete hardware components, or any combination thereof. Furthermore, any number of conventional techniques for electronics configuration, signal processing and/or control, data processing and the like may be employed. Also, the processes, functions, and instructions may can include software routines in conjunction with processors, etc.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 2A:
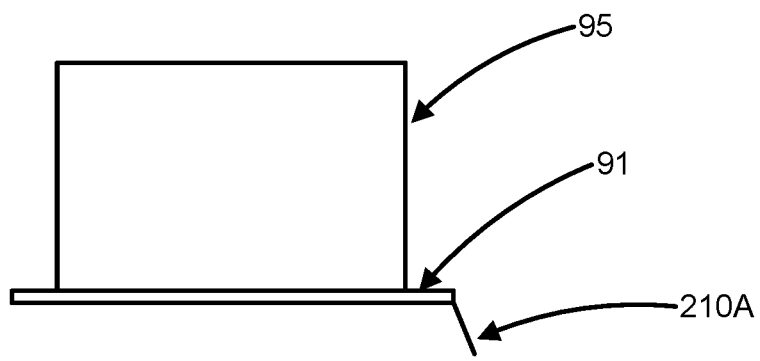
FIG. 2A and FIG. 2B are schematic views of different types of azimuth control devices mounted a payload support, in accordance with various embodiments.
Figure 2B:
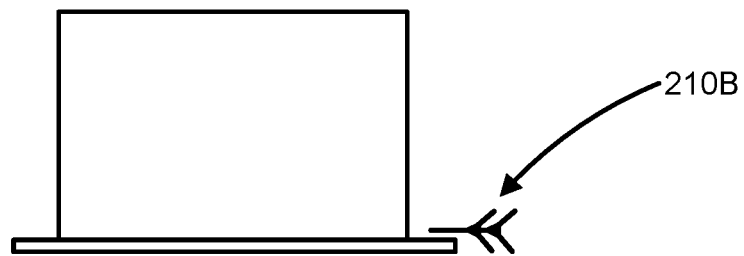

In various embodiments, and with reference to FIG. 2A and FIG. 2B, various examples of azimuth control devices are provided. For example, azimuth control device 110 may be a manipulatable control surface 210A (FIG. 2A), a thrust producing fluid jet device 210B (FIG. 2B), and/or a thrust producing propeller device, among others. These mechanisms are described in greater detail below, but the disclosed list of devices, structures, and mechanisms is only included to be illustrative of the types of components that may be implemented as an azimuth control device 110, and thus the disclosed features are not intended to be an exhaustive list of all the potential components that may be implemented to achieve controllable yaw rotation of a payload. Further, a parachute system may include different types of azimuth control device(s) 110 positioned and mounted to different portions/regions of the payload or payload support to effectively stabilize and collectively control the azimuth of the payload.

Figure 3A:
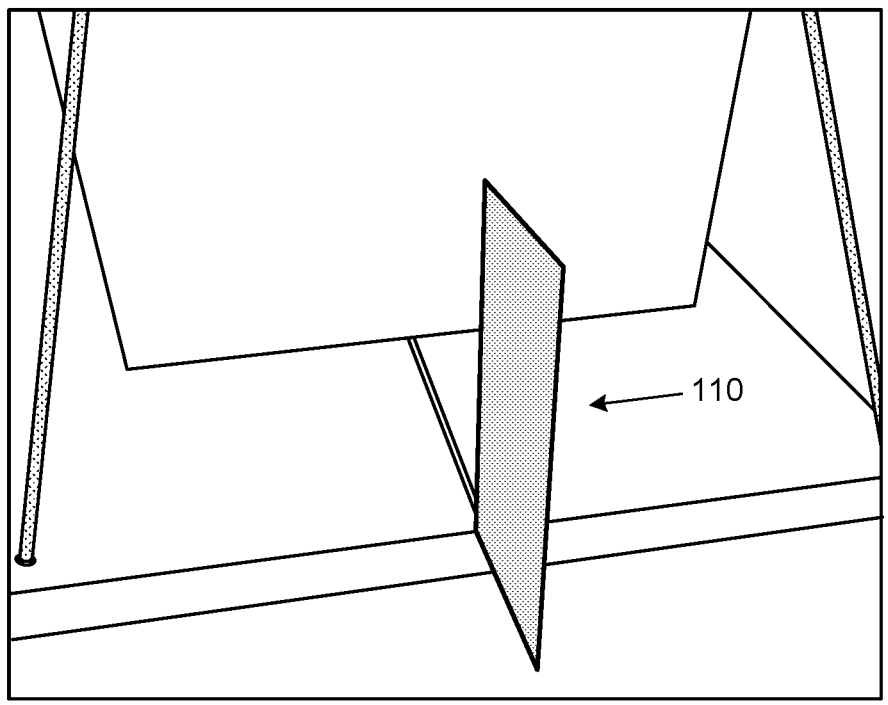
FIG. 3A, FIG. 3B, and FIG. 3C illustrate an azimuth control device as a manipulatable control surface, in accordance with various embodiments.
Figure 3B:
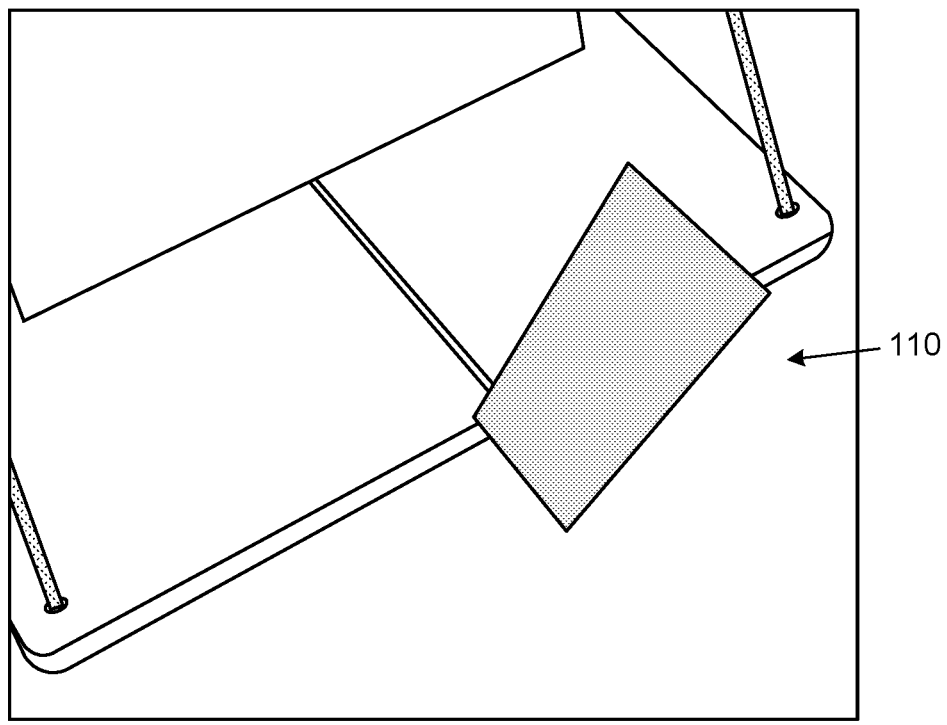
Figure 3C:
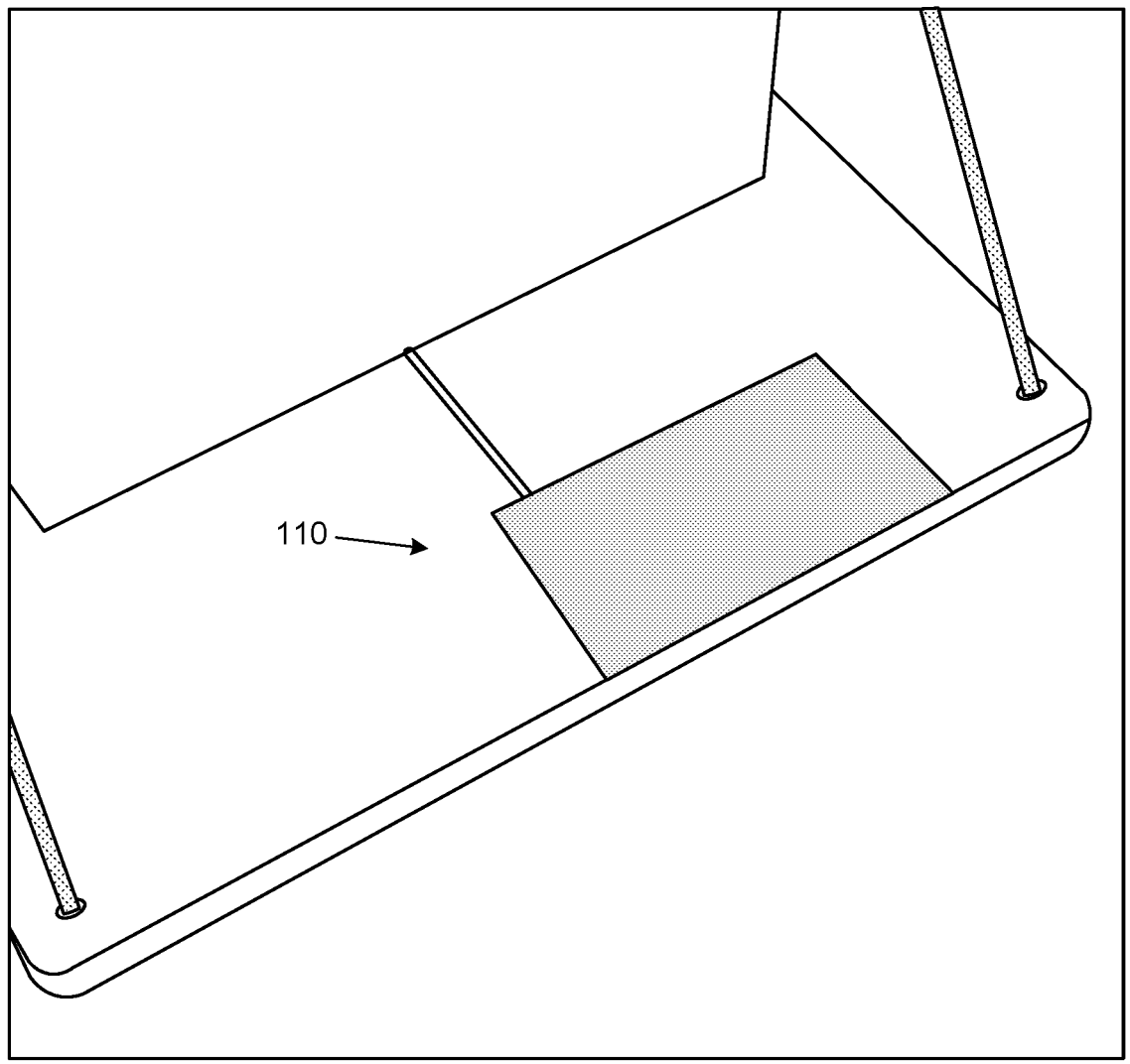

In various embodiments, and with reference to FIG. 3A through FIG. 3C, azimuth control device 110 is configured as a manipulatable control surface, such as a rudder or a plate. Although shown as a simple planar structure, the control surface may be a vane or a blade, and may thus have an airfoil configuration such that when the control surface is activated it functions with a leading edge, a trailing edge, a higher pressure surface, and a lower pressure surface. Moreover, as the ballistic parachute descends through an air mass, to an observer on the ground the parachute may appear to have horizontal velocity. That horizontal velocity, however, is only relative to the ground, and the parachute may have substantially zero horizontal velocity relative to the air mass in which it is descending. Therefore, all airflow past the payload may be vertical, flowing from the bottom toward the top. This airflow will, logically, be in effect as long as the system is descending through the air mass. If some of this airflow was deflected by the control surface, the resultant force from the redirection of air would cause yaw rotation of the payload, thereby achieving azimuth changes. In this regard, a manipulatable control surface, such as a rudder, can be manipulated in the airflow to cause a higher pressure on one side of the rudder than the other and, therefore, induce a yaw producing force. In various embodiments, only a small stored power source is utilized, for example a battery to provide power to move the control surface and/or power communications components or actuators. In other embodiments, a downward-facing thrust producing propeller or other similar components may convert airflow arising from the descent of the payload into rotational and/or electrical energy that may be utilized to move the manipulatable control surface. However, any suitable power and/or control components for azimuth control device 110 may be utilized, as desired.

In various embodiments, if the control surface was oriented vertically, no turning moment would be generated, but by moving the control surface in one direction, the end of the payload would be torqued in one direction. By reversing the pitch of the control surface, the end of the payload would be pushed in the opposite direction. It will be appreciated that the amount of force imparted by azimuth control device 110 and/or the duration of force imparted by azimuth control device 110 may be controlled and/or varied in order to cause a yaw turn of a desired amount. For example, in one embodiment, a solenoid may be utilized to cause movement of a rudder component of azimuth control device 110; the movement may be continuous or stepwise and the solenoid may be electromechanical or pneumatic. Moreover, a larger force may be exerted for a shorter length of time, or a smaller force may be exerted for a longer length of time in order to achieve a desired yaw turn. In some exemplary embodiments, azimuth control device 110 may be under regular and/or constant control and/or operation in order to maintain a payload generally along a desired azimuthal orientation, for example at times exerting a force in a first direction, at other times exerting a force in an opposite direction, as needed in order to achieve and/or maintain a desired orientation. Stated differently, the azimuth control device 110 may be configured to exert a force in a first direction at a first time and further configured to exert a force in a second, opposite direction at a second time, as needed in order to achieve and/or maintain a desired orientation.

In various embodiments, it may be warranted for the control surface to be positioned at the payload periphery. Because there may be certain practical or spatial restrictions regarding elements protruding beyond the periphery of an aerial delivery platform, and/or because of the high dynamic forces involved in the initial phase of deployment from an aircraft, the azimuth control device may be configured to transition from a stowed/stored position to an active/operable position. That is, before or during an initial deployment phase of the payload (when the descent speed is highest before the parachute slows the descent), azimuth control device 110 may not extend beyond the periphery of the payload platform. Once the payload descent has slowed sufficiently by the parachute, azimuth control device 110 may extend or otherwise move into an active/operable position. The transition from the stowed position to the operable position may be a curved or arced path, or may include a linear translation. For example, as shown in FIG. 3C, the control surface may be stored in a stowed position against the top surface of the platform, but may transition to an extended/operable position shown in FIG. 3A and FIG. 3B in order to affect azimuth changes.

In some exemplary embodiments, azimuth control device 110 may comprise multiple control surfaces such as rudders, located in multiple locations on a payload. For example, when a munition is gravity launched a launch platform may be pitched downward, for example at about 45 degrees from horizontal, in order to provide some forward trajectory for the munition. In such configurations, a single centered rudder may be insufficient to provide a desired amount of azimuth control, and multiple rudders may be employed (for example, one on each side of the payload, and one on the rear of the payload). However, multiple rudders or other control surfaces may be employed in various circumstances and are not limited to the foregoing downward pitched platform configuration example.

Figure 4A:
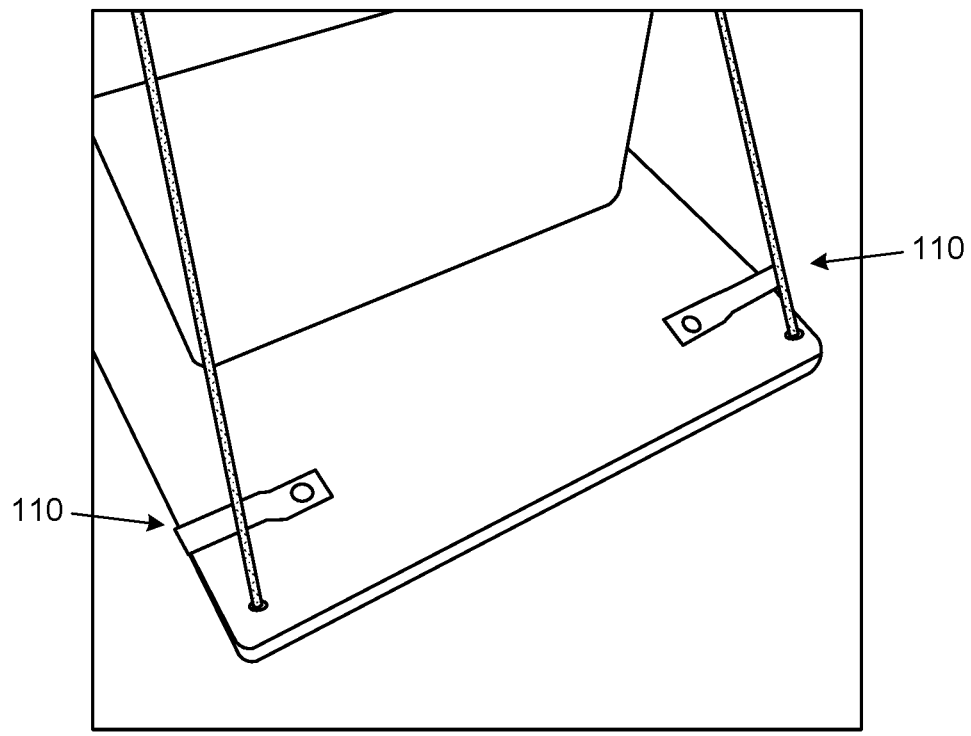
FIG. 4A and FIG. 4B illustrate an azimuth control device as a thrust producing fluid jet device, in accordance with various embodiments.
Figure 4B:
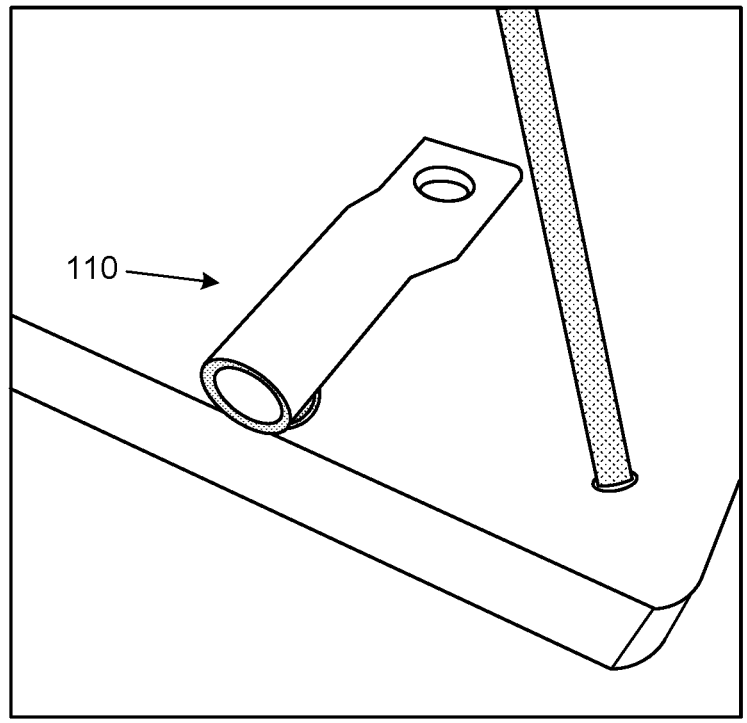

In various embodiments, and with reference to FIG. 4A and FIG. 4B, azimuth control device 110 may be configured as a fluid jet device. The fluid jet device may generally be configured to emit a thrust producing fluid stream in order to impart a yaw rotation to the payload. For example, compressed gas (e.g., compressed air) stored on the payload could be exhausted through one or more side facing nozzles to turn the payload in a desired direction. In another example, the source of the gas may be an exothermic combustion process. However, any suitable fluid jet device may be utilized, as desired.

Figure 5A:
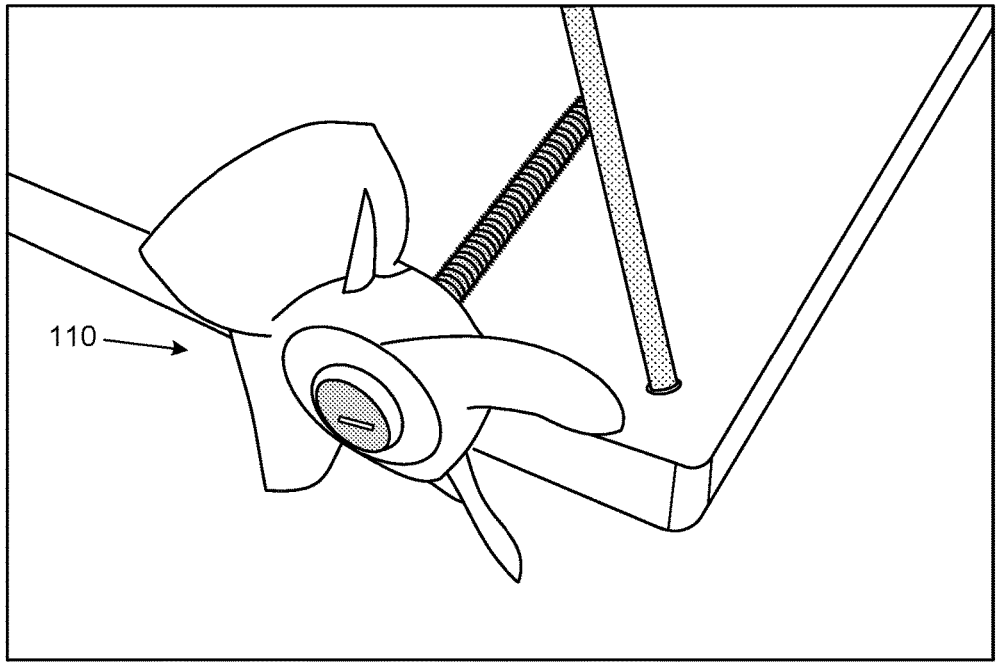
FIG. 5A, FIG. 5B, and FIG. 5C illustrate an azimuth control device as a thrust producing propeller device, in accordance with various embodiments.
Figure 5B:
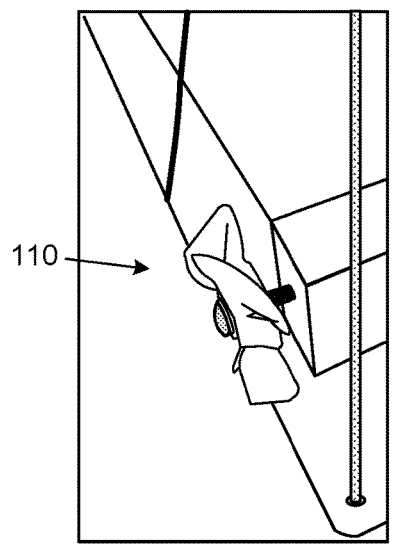
Figure 5C:
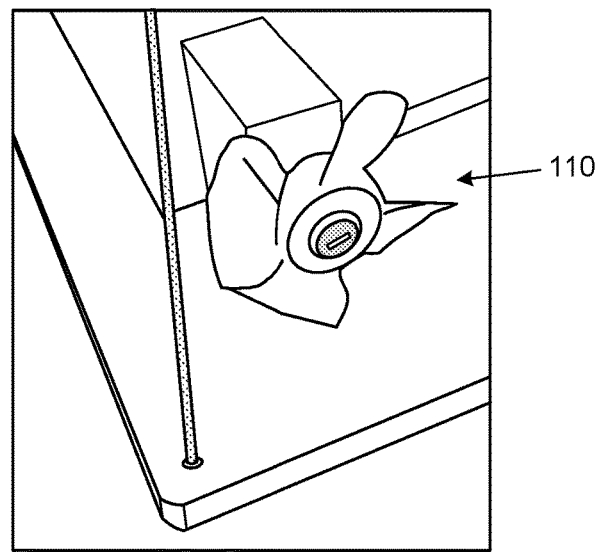

In various embodiments, and with reference to FIG. 5A through FIG. 5C, azimuth control device 110 may be configured as a thrust producing propeller device. That is, the parachute system may include one or more thrust producing propellers positioned around the payload that are powered by a stored energy source, and may be actuated (for example, by controller 120) to impart a turning force to induce yaw rotation of the payload. In such a configuration, the thrust producing propeller device(s) would function in a similar manner as does the tail rotor on a typical helicopter to rotate the payload to the desired azimuth. The thrust producing propeller device may be configured to push or pull the payload in yaw rotation, and thus the thrust producing propeller device may be configured to operate in a forward or reverse direction. Further, the thrust producing propeller device may be configured with a pitch reversal capability, thus allowing the pitch of the thrust producing propeller blades to be changed from positive to negative to result in the end of the platform being pulled in one direction or pushed in the opposite direction. However, any suitable thrust producing propeller configurations and/or capabilities may be implemented in azimuth control device 110, as desired.

Figure 6:
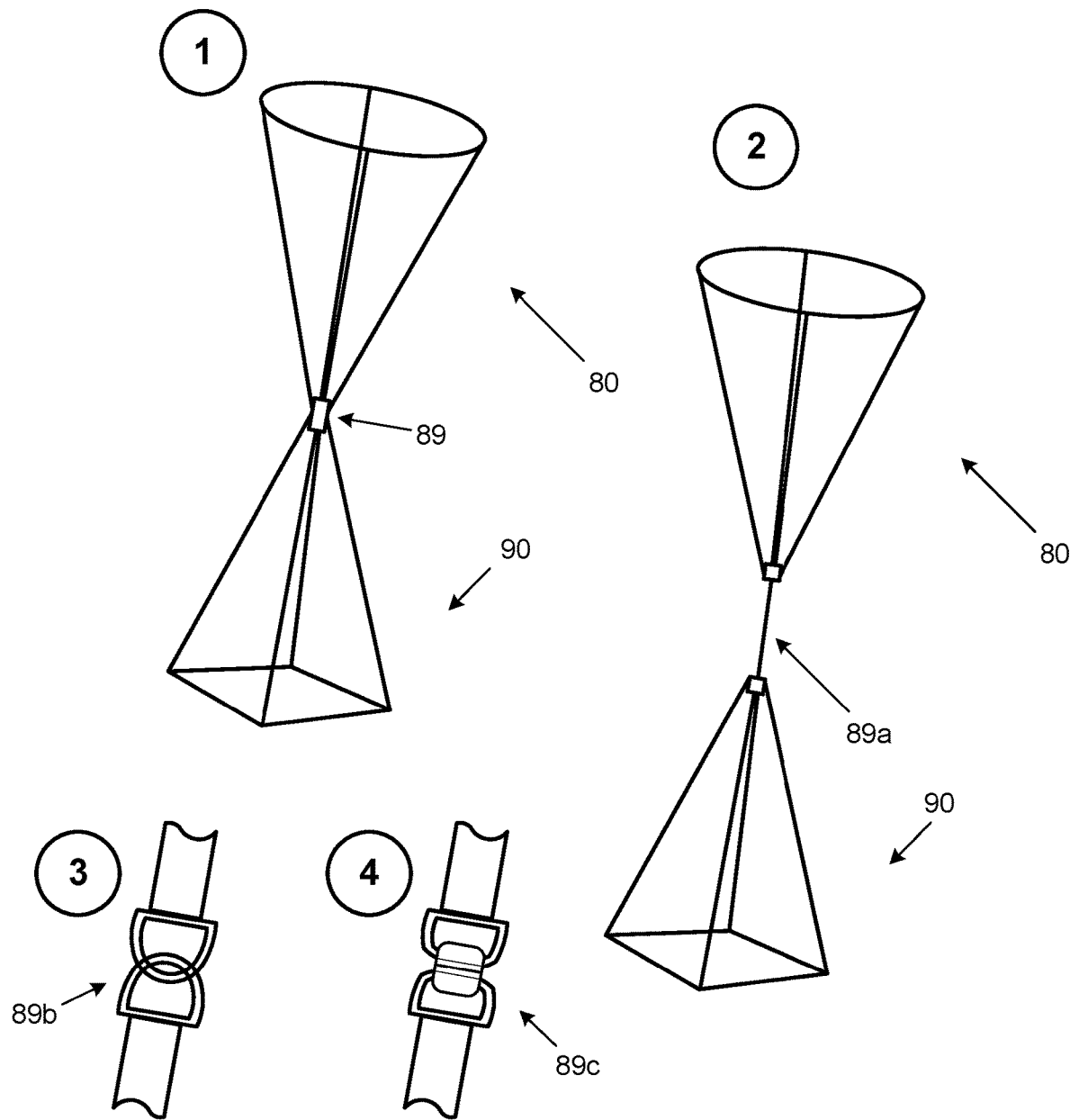
FIG. 6 is a schematic view of a connecting interface between a parachute and a payload, in accordance with various embodiments.

In various embodiments, and with reference to FIG. 6, if the parachute risers and the suspension straps of parachute 80 and payload support 90, respectively, are under significant tension, a conventional interface between the two may resist torque and thus the yaw movement of the payload may be limited. In various embodiments, the interface 89 between parachute and payload may include a textile sling 89a, and unless the textile sling 89a has several twists per unit of length, it provides almost no torque resistance. If the textile sling 89a were to be made of a material having high tensile strength, such as Kevlar, such a sling would have a comparatively smaller cross-section than a sling of equal strength made from nylon or other material, and would thus have less torque resistance. Moreover, if the textile sling 89a does not contain a significant amount of twist it will have very little tendency to return to its neutral (untwisted) configuration. Consequently, in various embodiments, and with continued reference to FIG. 6, the connecting interface 89 may include a pair of clevises/shackles 89b that can accommodate approximately 90 degrees of rotation with very little torque resistance. The pair of clevises/shackles 89b may be, but in various embodiments is not, combined with textile sling 89a. In this regard, the connecting interface 89 may include a first clevis/shackle coupled to a second clevis/shackle and configured to rotate with respect to the first clevis/shackle to accommodate rotation of the payload. Thus, by configuring the connecting interface between parachute and payload to have low torque resistance, the ability of azimuth control device 110 to impart rotational yaw movement to the payload is improved.

In various embodiments, and with continued reference to FIG. 6, the connecting interface 89 may include a swivel 89c that can accommodate 360 degrees of rotation with very little torque resistance. The swivel 89c may be, but in various embodiments is not, combined with textile sling 89a.

Figure 7:
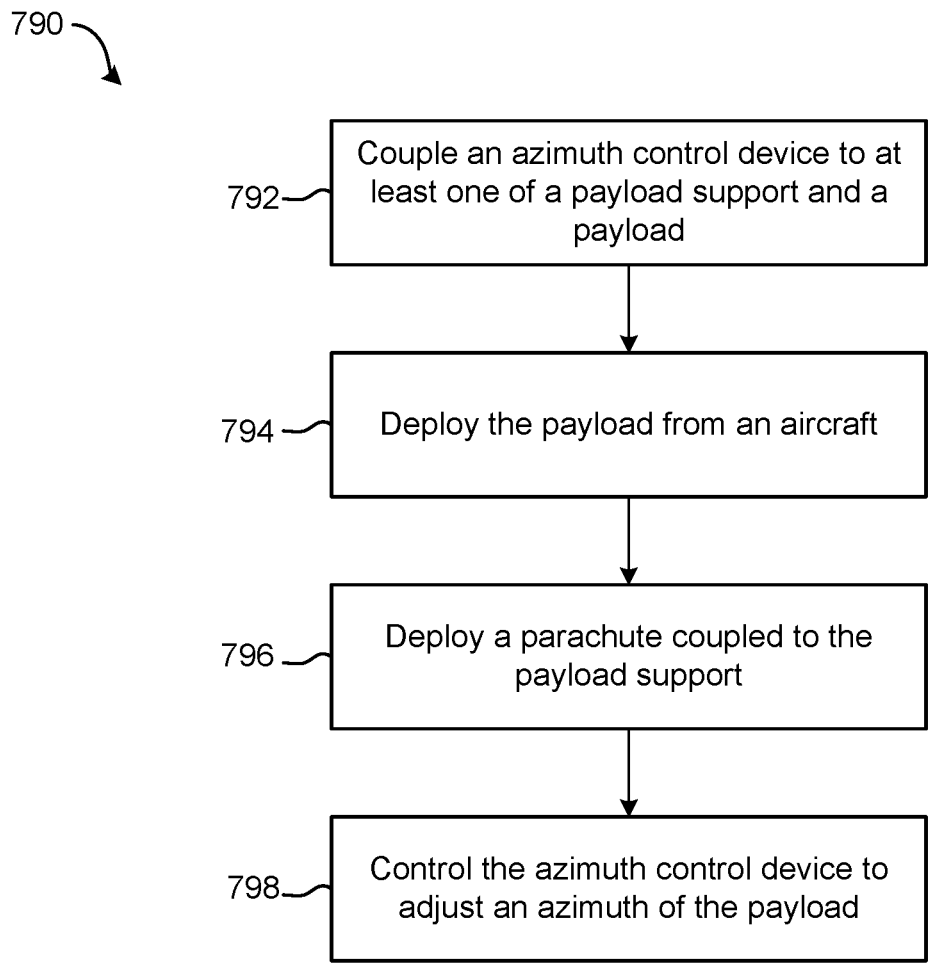
FIG. 7 is a schematic flow chart diagram of a method of using a parachute system, in accordance with various embodiments.

In various embodiments, and with reference to FIG. 7, a method 790 of using a parachute system is provided. Method 790 may include coupling an azimuth control device to at least one of a payload support and a payload (step 792), deploying the payload from an aircraft (step 794), and deploying a parachute coupled to the payload support (step 796). Further, method 790 may include controlling the azimuth control device to adjust an azimuth of the payload during descent of the payload (step 798). The azimuth control device may be controlled locally, for example via a computerized controller configured to maintain an azimuth of the payload on a desired heading; moreover, the azimuth control device may be controlled remotely, for example via a radio or other communications link from the deploying aircraft, from a drone, from a satellite, from a ground station, and/or the like.

In accordance with various exemplary embodiments, and with renewed reference to FIG. 1A, the azimuth control device(s) of the disclosed parachute system may be operated, for example, after a predetermined period of time, after the payload has reached a certain altitude, after the payload has reached a certain airspeed, and/or at any other suitable/desired time. Additionally, parachute release system 100 may be configured for remote operation. For example, parachute system 100 may be configured with wireless communication components allowing a user to send an operative command, for example an activation command, to azimuth control device 110. In this manner, a user may monitor the descent of a payload, the inflation of a drogue parachute, the inflation of an intermediary parachute, and/or the like, and may trigger operation of a parachute release mechanism 100 and/or activation and operation of the azimuth control device 110 mounted to the payload support.

Principles of the present disclosure may be utilized in connection with and/or may be complementary to or compatible with systems, methods, and/or principles disclosed in one or more of U.S. Patents: U.S. Pat. No. 8,083,184 entitled AERIAL DELIVERY SYSTEM; U.S. Pat. No. 8,096,509 entitled PARACHUTE INLET CONTROL SYSTEM AND METHOD; U.S. Pat. No. 8,186,624 entitled AERIAL DELIVERY SYSTEM; U.S. Pat. No. 8,210,479 entitled PARACHUTE INLET CONTROL SYSTEM AND METHOD; U.S. Pat. No. 8,313,063 entitled PARACHUTE RELEASE SYSTEM AND METHOD; U.S. Pat. No. 8,851,426 entitled ENHANCED CRUCIFORM PARACHUTE; U.S. Pat. No. 8,979,031 entitled AERIAL DELIVERY SYSTEM WITH MUNITION ADAPTER AND LOCKING RELEASE; U.S. Pat. No. 9,187,181 entitled PARACHUTE CANOPY INSERT; U.S. Pat. No. 9,399,514 entitled AERIAL DELIVERY SYSTEM WITH MUNITION ADAPTER AND LOCKING RELEASE; U.S. Pat. No. 9,452,842 entitled PARACHUTE CANOPY INSERT; U.S. Pat. No. 10,689,123 entitled PARACHUTE INLET CONTROL SYSTEM AND METHOD; or U.S. Pat. No. 10,723,468 entitled PARACHUTE INLET CONTROL SYSTEM AND METHOD, each to Fox. The contents of each of the foregoing are hereby incorporated by reference in their entirety (except for any subject matter disclaimers or disavowals, and except to the extent of any conflict with the disclosure of the present application, in which case the disclosure of the present application shall control).

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Reference throughout this specification to features, advantages, or similar language does not imply that all of the features and advantages that may be realized with the present disclosure should be or are in any single embodiment. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the subject matter of the present application may be practiced without one or more of the specific features or advantages of a particular embodiment. In other instances, additional features and advantages may be recognized in certain embodiments that may not be present in all embodiments of the disclosure. Further, in some instances, well-known structures, materials, or operations are not shown or described in detail to avoid obscuring aspects of the subject matter of the present disclosure. No claim element is intended to invoke 35 U.S.C. 112(f) unless the element is expressly recited using the phrase "means for."

The scope of the disclosure is to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. Further, the term "plurality" can be defined as "at least two." As used herein, the phrase "at least one of", when used with a list of items, means different combinations of one or more of the listed items may be used and only one of the items in the list may be needed. The item may be a particular object, thing, or category. Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A, B, and C. In some cases, "at least one of item A, item B, and item C" may mean, for example, without limitation, two of item A, one of item B, and ten of item C; four of item B and seven of item C; or some other suitable combination.

All ranges and ratio limits disclosed herein may be combined. Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Different cross-hatching may be used throughout the figures to denote different parts but not necessarily to denote the same or different materials. Surface shading lines may be used throughout the figures to denote different parts or areas but not necessarily to denote the same or different materials. In some cases, reference coordinates may be specific to each figure. Furthermore, the connecting lines shown in the various figures contained herein are intended to represent exemplary functional relationships and/or physical couplings between the various elements. It should be noted that many alternative or additional functional relationships or physical connections may be present in a practical system.

Any reference to attached, fixed, connected or the like may include permanent, removable, temporary, partial, full and/or any other possible attachment option. Additionally, any reference to without contact (or similar phrases) may also include reduced contact or minimal contact. In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The schematic flow chart diagrams included herein are generally set forth as logical flow chart diagrams. As such, the depicted order and labeled steps are indicative of one or more embodiments of the presented method. The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. Other steps and methods may be conceived that are equivalent in function, logic, or effect to one or more steps, or portions thereof, of the illustrated method.

Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown. Furthermore, no element, component, or method step in the present disclosure is intended to be dedicated to the public regardless of whether the element, component, or method step is explicitly recited in the claims.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A parachute system comprising:
   a payload support configured to operably support a payload below a parachute; and
   an azimuth control device mounted to at least one of the payload support or the payload, wherein the azimuth control device comprises:
      a first side facing fluid jet device configured to emit a first thrust producing fluid stream in a first direction to operably impart a yaw rotation to the payload in order to adjust an azimuth of the payload; and
      a second side facing fluid jet device configured to emit a second thrust producing fluid stream in a second direction opposite the first direction.

2. The parachute system of claim 1, further comprising a controller providing communication with the azimuth control device, the controller comprising a processor and a tangible, non-transitory computer-readable storage medium having instructions stored thereon that, in response to execution by the processor, cause the processor to control the azimuth control device.

3. The parachute system of claim 1, wherein the azimuth control device is configured to exert a force in a first direction at a first time and further configured to exert a force in a second direction at a second time, the second direction is opposite from the first direction.

4. The parachute system of claim 1, wherein the payload support comprises a platform and the azimuth control device is mounted to the platform.

5. The parachute system of claim 4, wherein the azimuth control device is mounted to the payload support a distance offset from a vertical center of mass axis of the payload in order to create torque to thereby induce the yaw rotation.

6. The parachute system of claim 1, further comprising an interface configured to be coupled between the payload and the parachute.

7. The parachute system of claim 6, wherein the interface comprises a first clevis/shackle and a second clevis/shackle configured to rotate with respect to the first clevis/shackle.

8. The parachute system of claim 7, wherein the first clevis/shackle extends through an opening of the second clevis/shackle.

9. The parachute system of claim 7, wherein the interface comprises a textile sling comprising Kevlar.

10. The parachute system of claim 9, wherein the textile sling is devoid of twists.

11. A method of using a parachute system, the method comprising:
   coupling an azimuth control device to at least one of a payload support or a payload, wherein the azimuth control device includes a first side facing fluid jet device configured to emit a first thrust producing fluid stream in a first direction to operably impart a yaw rotation to the payload in order to adjust an azimuth of the payload, and the azimuth control device further includes a second side facing fluid jet device configured to emit a second thrust producing fluid stream in a second direction opposite the first direction;
   deploying the payload from an aircraft;
   deploying a parachute coupled to the payload support; and
   operating the azimuth control device to adjust the azimuth of the payload during descent of the payload beneath the parachute.

12. The method of claim 11, wherein coupling the azimuth control device to at least one of the payload support or the payload comprises:
   coupling the first side facing fluid jet device to the at least one of the payload support or the payload; and
   coupling a second side facing fluid jet device to the at least one of the payload support or the payload;
   wherein the second side facing fluid jet device is configured to emit a second thrust producing fluid stream in a second direction, and the second direction is opposite the first direction.

13. A parachute system comprising:
   a parachute;
   a payload support configured to operably support a payload below the parachute;
   an interface between the parachute and the payload, the interface including a first textile sling extending from a first clevis/shackle toward the parachute and a second textile sling extending from a second clevis/shackle toward the payload support, the first clevis/shackle defines a first opening facing a first direction substantially perpendicular to a first direction of tension of the first textile sling, the second clevis/shackle defines a second opening facing a second direction substantially perpendicular to a second direction of tension of the second textile sling, the second clevis/shackle is configured to rotate with respect to the first clevis/shackle, and the second clevis/shackle extends through the first opening of the first clevis/shackle; and an azimuth control device mounted to at least one of the payload support or the payload.

14. The parachute system of claim 13, wherein the at least one of the first textile sling or the second textile sling is devoid of twists.

15. The parachute system of claim 13, wherein the azimuth control device is configured to operably impart a yaw rotation to the payload in order to adjust an azimuth of the payload.

16. The parachute system of claim 15, wherein the interface is configured to rotate in response to the azimuth of the payload being adjusted.

17. The parachute system of claim 15, wherein the interface is configured to accommodate the yaw rotation of the payload.

* * * * *